Feb. 6, 1940.  I. C. RINN  2,189,299
FILM PACK, ESPECIALLY FOR DENTAL FILMS AND THE LIKE
Filed Sept. 20, 1938
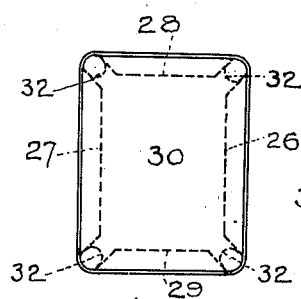
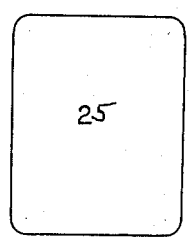
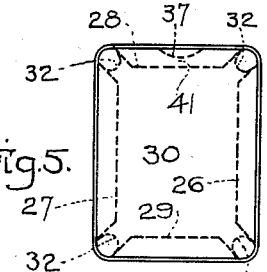
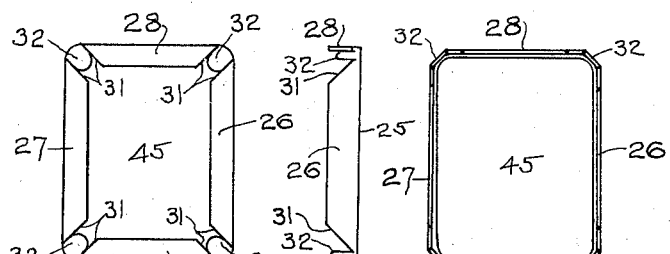
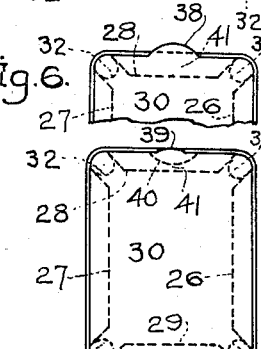
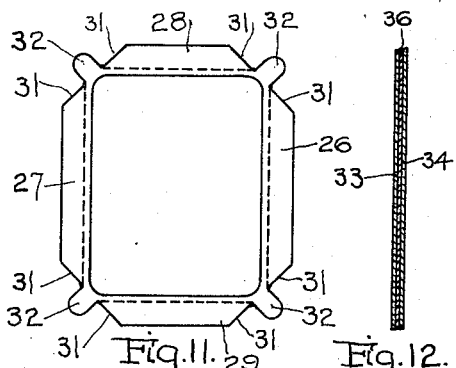
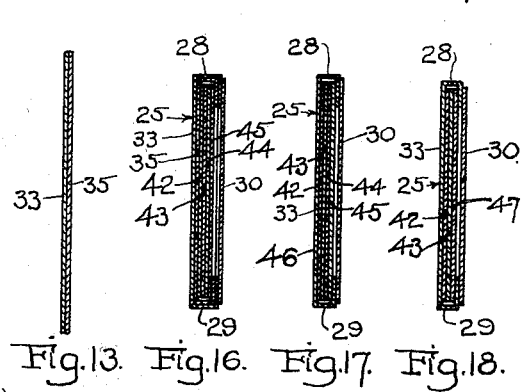
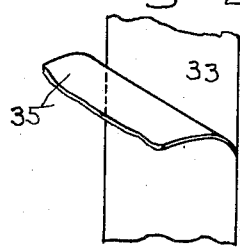
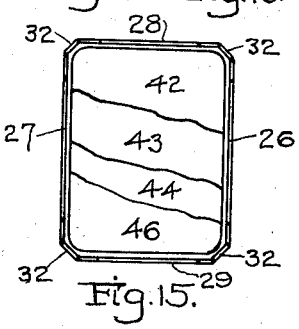
Inventor:
Irwin C. Rinn,
by [signature]
Atty.

Patented Feb. 6, 1940

2,189,299

UNITED STATES PATENT OFFICE 2,189,299

FILM PACK, ESPECIALLY FOR DENTAL FILMS AND THE LIKE

Irwin C. Rinn, Chicago, Ill., assignor to Irwin C. Rinn & Company, Chicago, Ill., a corporation of Illinois Application September 20, 1938, Serial No. 230,774

4 Claims. (Cl. 250—69)

This invention relates to an improved film pack or package which is especially intended for the use of dentists and technicians for securing images of the human teeth. The film pack herein disclosed is intended for placement in the mouth of the patient, and behind the teeth to be X-rayed, so that when a beam of X-rays is directed against the proper portion of the mouth and jaw the X-rays will be projected through the tissue thereof and will produce an image on the film contained within the pack. Film packs for this and similar uses are well known at the present time. In order that the features of the present invention may be better understood I shall mention certain of the conditions encountered in the use of these devices.

One of the features of the present invention relates to the provision of a package having the cover sheet sealed to the body of the package by means of a new and distinct sealing or cementing medium so as to more effectively produce such a package meeting the requirements of such use, including water-proofness, etc., without interfering with the necessary transparency to X-rays.

The package is generally made of a body portion comprising a sheet having two thicknesses or layers, the outer layer being of white or other attractive paper or material, and the inner layer being of black or light proof material. These layers are cemented or stuck together into a double thickness sheet, and the edge portions which are thereafter turned up and over the film and other contents also comprise such double thickness of material.

Another feature of the invention relates to the use of a new and improved cementing agent for attaching the two layers or sheets together, which agent not only serves to effectively join the sheets together, but does not materially increase the stiffness of the combined sheet. In other words the combined sheet is relatively soft as compared to the two layer sheets heretofore possible to use for this purpose.

Another object of the invention is to make use of a cementing or attaching agent or medium which is of itself an excellent waterproofing agent, so that the combined two layer sheet is completely waterproof, and will effectively resist the action of the saliva for long intervals of time, and with consequent protection to the contents of the pack, including the film.

In some cases I may eliminate the use of one layer or sheet in the production of the film pack by using a paper faced metal sheet or foil as the cover sheet for the completed pack, with consequent reduction of cost of manufacture, and also reduction of thickness of the completed pack.

Generally speaking, I use a cementing agent in the form of a paraffin material between the sheets, or a treated portion of one or both the sheets to be cemented together, which material will exercise its cementing function with merely the application of heat, and without the need of any moistening of the surfaces to be joined. This paraffin material or paraffin treated sheet or layer is of itself completely waterproof, and it does not become loosened under the influence of water or saliva, so that it serves as an ideal agent for the present purposes.

The paraffin cementing may in some cases be produced by use of a distinct layer of a paraffin material set between the two sheets to be joined, as in the production of the double layer sheet which comprises the body portion of the pack, or in other cases use may be made of a pretreated or specially treated paper sheet or layer which has been paraffin treated in proper manner so that the sheet becomes water proof, and also so that such sheet will, merely by the application of heat, attach itself to another sheet or object with a very firm and permanent and water proof connection.

In the first case or condition just above referred to use may be made of such materials as what is known as "Parafilm," which is a paraffin like material now being extensively produced and marketed under such name; and in the second case or condition just above referred to use may be made of such materials as what is known as "Thermium," which is a specially paraffin treated sheet or layer now being extensively produced and marketed under such name, produced by Better Packages, Incorporated. I do not intend to limit myself to the use of these specific materials, except as I may do so in the claims to follow, but I mention them as excellent examples of materials which respond to the requirements of my present invention.

Another feature of my present invention relates to the provision of a new and improved arrangement for facilitating the removal of the cover sheet after the film has been exposed, and preparatory to development and other treatment in the dark-room. When such cover sheet is cemented to the body of the enclosure by a too strong cement it is necessary to tear away such cover sheet from the edge portions of the body to which the cover sheet was cemented.

It is a valuable and distinctive portion of my present invention that I have discovered that such paraffin like cementing agents, while effectively serving the desired cementing and sealing function, nevertheless permit the cover sheet to be torn away from the opposite sides edges of the body of the pack, so that it is not necessary to leave any uncemented end portions, either at the end where the cover is to be grasped or the other end thereof. And I also contemplate the use of a cover sheet which is provided with tabs or the like by means of which it may be readily grasped for removal, or the provision of a cementing action of the cover sheet to the end of the body portion in such manner that the end portion of the cover sheet may be readily grasped to commence such removal action.

Other features and objects of the invention will be apparent from a detailed description thereof, which consists in the features of construction, and combinations of parts hereinafter described and claimed.

In the drawing;

Figure 1 shows a front face view of a film incorporating the features of the present invention, showing the cover sheet in place, and without any provision for facilitating the removal of such cover sheet;

Figure 2 shows a side edge view corresponding to Figure 1;

Figure 3 shows a back face view corresponding to Figures 1 and 2;

Figure 4 shows a top edge view corresponding to Figures 1, 2 and 3;

Figure 5 shows a front face view of a modified form of pack embodying the features of my present invention, and in which the cover sheet is cemented to the top edge portion of the body in such manner as to leave an uncemented notch into which the finger nail may be inserted, or where the edge of the cover sheet may be ruffled to facilitate removal thereof;

Figure 6 shows a fragmentary front face view of another modified form of pack embodying the features of my present invention, and in which the cover sheet is provided with an end tab projecting slightly beyond the end of the body portion of the pack to facilitate removal of the cover sheet;

Figure 7 shows a front face view of still another modified form of pack embodying the features of my present invention, and in which the cover sheet is provided with a tab in its end portion, and in which the cementing of the cover sheet to the body portion of the pack, is so effected as to leave an uncemented notch at the position of such tab, to effect removal of the cover sheet;

Figure 8 shows a front face view of a pack having the edge portions of the body thereof turned over against the contents of the pack, and preparatory to cementing of the cover sheet into place;

Figure 9 shows an edge view of the body portion of the pack of my present invention with the edge and end portions thereof turned up at right angles during the manufacturing operations;

Figure 10 shows a front face view corresponding to Figure 9;

Figure 11 shows a face view of the blank from which the body portion is made, and with a film protecting sheet laid into place thereon;

Figure 12 shows a section through a portion of two sheet material such as may be used for the body portion of the pack of the present invention, and with an intermediate layer of paraffin like material such as the so-called "Parafilm" for cementing these layers together;

Figure 13 shows a section similar to that of Figure 12 but showing a two sheet layer for the body portion, one of the layers whereof is of such specially treated material such as the so-called "Thermium," which two layers may be cemented together merely by heat treatment;

Figure 14 shows a face view of a two sheet layer of material for the body portion, with the two sheets cemented together by such material as the so-called "Thermium," and one of the layers being partially torn away from the other;

Figure 15 shows a face view similar to that of Figure 10, but with the inserts successively torn away to better show them in place;

Figure 16 shows a longitudinal section through a completed film pack formed by the use of a double layer of material for the body portion, and with four distinct layers of insert therein;

Figure 17 shows a view similar to that of Figure 16 but with a body portion made of single layer of material; and Figure 18 shows a view similar to those of Figures 16 and 17 but with a body made of a single layer of material, and with three distinct layers of insert therein.

The film packs herein illustrated include a body portion having its edges folded over against the layers of insert material, together with a cover sheet which has its edges cemented to such so-turned over edges of the body portion. Thus, in each of several figures, the body portion 25 has its side edges 26 and 27, and its end edges 28 and 29 folded over the contained layers. The cover sheet 30 is set against these turned over edge portions and cemented thereto.

The formation of the corners of the film pack generally presents a special condition; and as a consequence I have shown the side and end edge portions as being so formed as to present the truncated ends thereof as shown at 31 (see Figure 11), and I have shown the corner lugs 32 intermediate between the side and end portions. All of these portions are die cut as shown in Figure 11 so that when the side and end edges are folded over against the contained layers of material these corner lugs will come snugly between the truncated portions just referred to. Such condition is well shown in Figures 1, 5, 6 and 7. By this means it is intended that the corners of the pack shall be effectively closed in a water and light tight manner; but it will nevertheless be evident that due to the folding of the lugs 32 there must be distortion of the material during the forming operations, so that it is not possible to produce rounded corners, without considerable distortion and misforming of the corner portions of the pack. These facts result in the further condition that frequently the material becomes broken at the corners, with consequent formation of cracks through which light and/or water may enter with deterioration of the film contents. This objectionable condition is greatly increased by the stiffness of the material from which the body of the pack is made.

It is desirable to use a body portion comprising two layers or sheets of material, shown in Figures 12 and 16, as 33 and 34, and in Figure 13 as 33 and 35. The outer layer which is the outside of the completed pack is frequently made of white material, having a pleasing finish; and the inner layer is generally made of black material to ensure complete exclusion of light from the interior of the pack. These two layers must be cemented or fastened together, and heretofore it has been customary to do so by the use of glues or similar agents. The result is that the double layer material is of considerable stiffness so that when the edges, and especially the corners, are turned over during the pack forming and closing operations, it is very difficult to form nicely turned and rounded corners for the completed pack; but especially it is found that frequently the material cracks at these and other points with consequent allowing of light and moisture to enter. It has been determined that a large portion of this stiffness is due not to the double thickness of the material used, taking account of the fact that it is cemented face to face at all points, but rather to the nature of the cementing or gluing agent used for this purpose. Furthermore, the glues heretofore used for this purpose have not been entirely waterproof, so that the pack has not been completely water resistant.

I have discovered the fact that by using a cementing agent such as "Parafilm", heretofore mentioned, the two sheets or layers of material may be cemented together face to face merely by application of heat; that when so cemented together the cementing action is not only waterproof in itself but that the cementing layer serves to greatly increase the waterproofing of the double layer combination; and especially that the stiffness of the combined sheet is much less than that of a double layer sheet in which the layers are glued together as heretofore; so that when the film pack is formed from such an improved double layer material it is not only possible to make a pack of improved appearance, but also the danger of cracking at the corners and elsewhere is greatly reduced or completely eliminated, with consequent avoidance of light and moisture leaks.

In Figure 12 I have shown an intermediate layer 36 of the "Parafilm" set between the inner and outer sheets 34 and 33, and then when heat is applied this inner or intermediate layer 36 will substantially disappear due to the penetration of the paraffine like material into the inner and outer layers themselves. Such penetration results in the improvement of the waterproof quality of the inner and outer layers, and also results in the reduced stiffness of the combined double layer sheet as already referred to.

In Figure 13 I have shown a double layer sheet comprising the outer layer 33 of white or other pleasing appearance material, together with an inner layer 35 of such paraffine like treated material as the so-called "Thermium" heretofore referred to. In this case such Thermium layer is cemented or attached directly face to face to the other layer merely by application of heat, and results in production of a two layer sheet of substantially waterproof quality, great flexibility, and greatly improved qualities compared to other previously known double layer materials.

The cover sheet 30 is cemented to the turned over side and end edges. Heretofore it has been customary to use glue or similar cementing agent for this purpose. Such agent is not waterproof; but is of such nature that it has generally not been possible to remove the cover from the turned over edge portions except by actually tearing the central strip portion of the cover away from the side portions thereof. To do this it has generally been necessary to leave the ends of the cover uncemented to the end edge portions 28 and 29 of the body, with consequent objections from the standpoint of lack of waterproofing and also danger of light penetration into the film pack.

As a further feature of the present invention I make use of such paraffin like treated materials as "Thermium" for the cover sheet or layer, since such materials may be directly cemented to the edge portions 26, 27, 28 and 29 merely by application of heat, are waterproof, and can be removed from the edge portions 26, 27, 28 and 29 without excessive force and without the need of tearing the central strip of the cover sheet from the side portions thereof. This also makes it possible to attach the end portions of the cover strip to the end portions 28 and 29 of the body portion by such heat cementing action, with consequent production of a completely light and waterproof pack, and also without impairing the ability to readily remove the cover from the body portion in the darkroom. Such Thermium sheet possesses the property that it will cement itself directly to the edge portions 26, 27, 28 and 29 when pressed thereto with application of heat.

The removal of the cover sheet is effected by taking hold of one end thereof and pulling it upwards and away from the body portion of the pack. In many cases the end portion of the cover sheet may be readily taken hold of. In other cases it is desirable to make provision to facilitate taking hold of such end portion, especially for manipulation in the darkroom. For this purpose various expedients are shown herein. Thus, in Figure 5 I have shown the cover as being entirely rectangular or of regular form, but I have shown the notch or finger nail location 37 between the faces of the end lug 28 and the cover sheet, which notch is uncemented to the lug so that the finger nail may be readily inserted thereinto in order to commence the removal operation. Such notch is readily formed during the process of cementing the cover sheet in place by merely forming the heating and pressing die with a recess corresponding to such notch and over the area of which recess there is exerted no pressure between the parts. The result is the leaving of the uncemented area 37. Or again, in Figure 6 I have shown an arrangement in which the cover sheet is provided with a tab 38 which extends out beyond the edge of the end lug 28 so that after the cementing operation has been completed such tab remains uncemented and can be readily taken hold of to commence the removal operation. Or again, in Figure 7 I have shown a sort of hybrid or combination arrangement in which the cover sheet is provided with the small tab 39, and in which the pressing and heating die is provided with a small recess at a registering position so that when the cementing operation has been completed the cover sheet will be uncemented to the lug 28 over the area of the notch 40. The tab 39 may extend out only slightly as shown so that by a slight brushing movement of the finger across the end of the pack this tab 39 will be bent outwardly, and then in conjunction with the notch 40 a sufficient grasp may be taken on the end portion of the cover sheet to facilitate the removal thereof.

It is to be noted that in each of the arrangements just disclosed the entire end portion of the cover sheet is cemented to the lug 28 across the width of the pack, so that there remains no portion of the periphery of the cover sheet which is uncemented to the body portion of the pack. This is true because the notches 37 or 40 are in each case of less dimension across the lug 28 than the width of such lug which is overlain by the cover sheet, thereby leaving in every case a portion 41 of cover sheet which is cemented to the lug. Consequently a completely sealed and waterproof and lightproof pack is produced, notwithstanding the provision in each case of means whereby the cover sheet may be readily grasped for removal from the body portion.

Referring to Figure 16, in this case I have shown as contained within the pack, first a layer or sheet 42 against the floor of the pack, then a sheet of film 43, then a layer of black or light proof material 44, and then a layer or foil of lead 45. The layer or sheet 42 is generally used in order to protect the film from direct contact with the material of the double thickness sheet of which the body of the pack is made. This is because it is generally found that the stock from which the double thickness body portion is made, (and especially the black inner sheet thereof) is not entirely neutral, but is generally slightly acid due to the sulphite process used in the manufacture thereof, and such non-neutral stock has a deleterious action on the film and will frequently cause spotting thereof when the film is allowed to come into direct contact with such non-neutral stock. The sheet 42 is treated on one surface (which comes into contact with the film) in such manner as to avoid any such action. The black sheet or layer 44 serves to completely insulate the film against any leakage of light from that face of the pack. The lead or metal foil sheet 45 serves to prevent reflection of the X-rays from the back portion of the mouth onto the film, and thus avoids the formation of "false images." It is to be understood that in use this lead foil should be placed to the back or away from the source of the X-rays (by properly setting the film pack into the mouth). The cover sheet or layer 30 comes to the outside of all these inserts.

In the arrangement of Figure 17 the same inserts are shown as in Figure 16, but in the present case the body portion of the pack comprises a single layer or sheet 46, which may be of paraffin material treated stock, so that it is completely waterproofed. In the present case use may be made of such material as "Thermium," both for the body portion of the pack and also for the cover sheet or layer.

Such paraffin treated materials as heretofore mentioned, as for example "Thermium" have the property that they may be cemented directly to lead and other metal foils merely by the application of heat. Therefore in Figure 18 I have shown a pack similar to that of Figure 17 with the exception, however that only a single sheet or layer 47 is shown beyond the film 43, indicating a sheet of lead or other metal foil which has, if desired, a layer of Thermium or similar stock cemented directly to its face. Or, if desired, instead thereof, this arrangement may incorporate the sheet or layer 47 of black paper or stock, and the cover sheet 30 may in such case be directly cemented to the edge portions of the body, said cover sheet comprising a sheet of lead or other metal foil which, as above explained, will cement directly to the edge portions when the body sheet is of Thermium or similar treated material or stock.

It is to be noted that there is a very peculiar and desirable relationship between the paraffin treated material such as "Parafilm" or "Thermium" and the other sheets or parts comprising the complete film pack, which relation is not found in other uses of these materials with which I am aware. Thus, for example, the paraffin treated materials are transparent to X-rays, so that such rays are not cut off thereby to such an extent which will materially interfere with the proper functioning of the film pack for the intended purposes; these materials serve to establish a much more flexible or softer double sheet than is produced when the two layers are glued together, so that the formation of cracks especially at the corners is avoided; this results in elimination of light and moisture leakage to the enclosed film; the cementing of the cover sheet by the heat application to such materials as "Thermium" serves to provide the needed physical attachment, but with a degree of holding power which permits the cover sheet to be completely removed without having to tear it longitudinally from the edge lugs; and a completely waterproof pack of attractive appearance is provided at low cost.

It will be understood that I contemplate as being within the scope of my invention paraffin treated materials, and especially such materials wherein the cementing action between the body portion and the cover sheet may be effected entirely by application of heat, and without application of water or other solvent agent; and that the reference to "Parafilm" and/or "Thermium" is by way of illustration only, except as I may limit myself in the claims to follow.

As an example of what I have herein referred to as "Parafilm" I may mention a flexible stretchable base film comprising a wax and a rubber and having an adherent flexible non-tacky coating such as disclosed in Letters Patent of the United States, No. 2,078,172, issued April 20, 1937; or a heat sealing composition comprising 70–94% of paraffin wax having a tensile strength of from 40–300 lbs. per sq. in., and a melting point of from 120–140 degrees F., 6–30% of pale crepe rubber, said composition having imparted thereto a viscosity of at least 8000 secs. (Scott), and being adapted to form moistureproof, waterproof, non-tacky, elastic and flexible films which remain flexible at low temperatures, as disclosed, for example, in Letters Patent of the United States, No. 2,054,112, issued September 15, 1936; but I wish it distinctly understood that by mentioning the foregoing specific examples of a suitable cementing agent for uniting the sheets of paper stock together I do not intend thereby to limit myself to such specific materials, except as I may do so in the claims to follow.

While I have herein disclosed certain embodiments of my invention, still I do not intend to limit myself thereto except as I may do so in the claims to follow.

I claim:

1. As a new article of manufacture, a film pack for the specified purpose, comprising a body member composed of a pair of sheets of paper stock material, paraffin like cementing agent joining said sheets together face to face, said cementing agent being transparent to X-rays, one sheet being substantially opaque to transmission of visible light and the other sheet comprising a finish sheet, suitable inserts laid in proximity to said light opaque sheet and including a sensitized film, edge and end lugs on said body member turned up and over the edge and end portions of said inserts, a cover sheet laid against said turned over lugs, and cementing agent joining said cover sheet to said lugs, said cementing agent comprising a paraffin like material transparent to X-rays, whereby said body member comprises a composite or double sheet having substantial softness and flexibility with resulting avoidance of cracking and light entrance at the positions of said lugs, and whereby both said body portion and said cover cementing means are substantially water-proof and transparent to X-rays, substantially as described.

2. As a new article of manufacture, a film pack for the specified purpose, comprising a body member composed of paper stock material having a series of lugs around its peripheral portion, suitable inserts laid against said member and including a film having a sensitized surface, said lugs being turned over against the edge portions of said inserts, a rectangular cover sheet laid against said lugs, suitable cementing means joining said cover sheet to the lugs comprising a cemented band around the entire periphery of the film pack, comprising paraffin like material impregnated into the material of the cover sheet and the lugs by application of heat and pressure, and means to facilitate removal of the cover sheet from the lugs, comprising a relatively small portion of the edge of said cover sheet uncemented to the lugs only partly across the width of the cemented band whereby the cemented connection is continuous around the entire periphery and the means to facilitate cover removal is provided substantially as described.

3. As a new article of manufacture, a film pack for the specified purpose, comprising a body member composed of suitable material which is paraffin treated to thereby render waterproof and flexible and is transparent to X-rays, a series of lugs on the peripheral portion of said body member, suitable inserts laid against the body member and including a film having a light sensitized surface, the lugs being turned over against the edge portions of the inserts, a cover sheet laid against the lugs, and means to cement the cover sheet to the lugs, comprising paraffin like material impregnated into the lugs by application of heat and pressure and transparent to X-rays, substantially as described.

4. As a new article of manufacture, a film pack for the specified purpose, comprising a body member and a cover sheet therefor, suitable inserts between said parts and including a film having a light sensitized surface, and cementing agent joining the entire periphery of the cover sheet to the body member without gaps, comprising suitable paraffin like material impregnated into both the cover sheet and the body member under application of heat and pressure and transparent to X-rays, substantially as described.

IRWIN C. RINN.